Dec. 22, 1953 W. G. FETTER ET AL 2,663,783
WRINKLE TYPE REPLACEABLE CAP FOR WELDING ELECTRODES
Filed June 1, 1951
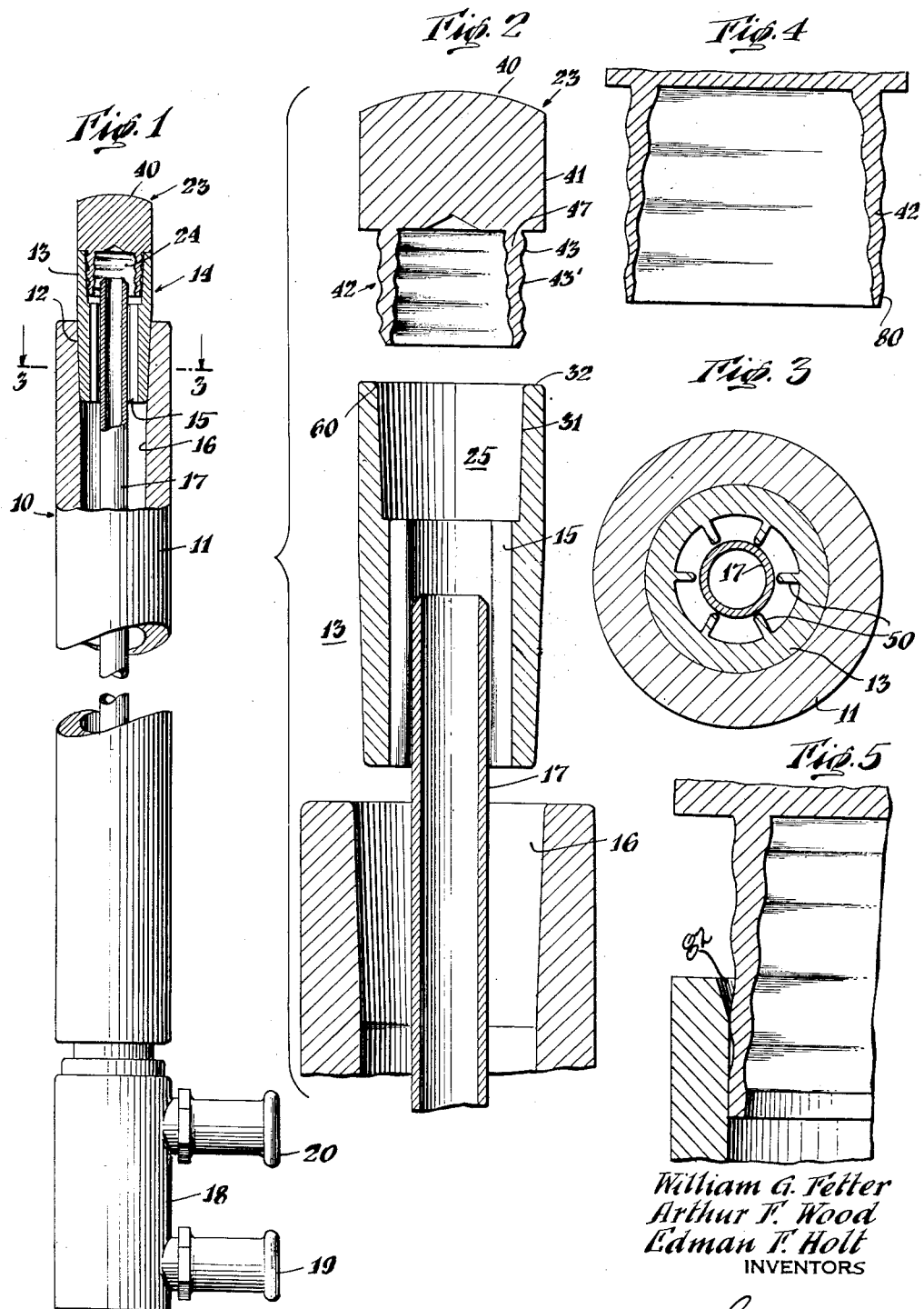
William G. Fetter
Arthur F. Wood
Edman F. Holt
INVENTORS
BY Nicholas Lauzel
ATTORNEY Patented Dec. 22, 1953

2,663,783

UNITED STATES PATENT OFFICE 2,663,783

WRINKLE TYPE REPLACEABLE CAP FOR WELDING ELECTRODES

William G. Fetter, Arthur F. Wood, and Edman F. Holt, Indianapolis, Ind., assignors to P. R. Mallory & Co., Inc., Indianapolis, Ind., a corporation of Delaware Application June 1, 1951, Serial No. 229,378

3 Claims. (Cl. 219—4)

1

This invention relates to improvements in welding electrodes for welding machines, and more particularly to spotweld tips with replaceable inserts for use therewith.

In the art of resistance welding, a replaceable insert for the spotweld tip is commonly referred to as a cap. The cap type welding electrode is, therefore, one in which the welding end of the electrode is a relatively small piece of suitable electrode metal designed so that it may be conveniently attached or detached from a tip which is generally more massive and is substantially permanently provided as a supporting member for the cap. The supporting member into which the cap is fastened is usually termed the shank tip. The shank tip, in turn, is normally fitted or attached to a heavier barrel, holder or die. Essentially, the purpose for and desirability of the use of a cap type of electrode is that such an electrode, because it is adapted for an extended time in use, reduces the cost thereof per given number of welds, and thus conserves the critical electrode tip metal.

An important object of the invention, then, is to provide a separate replaceable cap which may be detachably secured to a welding tip so that as the face of the cap becomes burned or eroded, the cap may be readily replaced, thus to substantially reduce the amount of metal used for the welding electrode.

A further object of the invention is to provide in a welding tip a detachable cap which can be easily replaced when so worn as to be no longer serviceable for the welding process.

Still another object of the invention is to provide an improvement in a welding electrode so as to reduce the cost of the electrode per given number of welds.

Still another object of the invention is to provide in the tip of a welding electrode, a cap having an annular corrugated configuration providing a series of sealing rings and which, when said cap is seated on the tip or shank of said welding electrode, will effectively prevent the escape of any coolant utilizable therewith.

Still another object of the present invention is to provide in a welding electrode, an annular corrugated cap having a plurality of corrugations permitting ready deformation thereof within the shank tip of said welding electrode, whereby said corrugations possess a substantial resilience which insures a tight fit to the electrode while avoiding seizure thereof.

Still another object of the present invention is to provide for a welding electrode, a cap having

2 a plurality of annular corrugations which, when utilizable in intimate relationship with the shank of said welding electrode, effectively acts to remove surface soil and surface film from the adjoining surfaces of the electrode and assures low electrical contact resistance so as to aid in the passage of welding current with a minimum of heating.

Still another object of the invention is to provide a welding electrode having a replaceable cap fabricated so as to provide maximum conductivity from the extreme active welding end portion to the portion adjacent the free end to allow an unrestricted flow of coolant thereto.

Still another object of the invention is to provide an improved cap electrode wherein the cap and the shank of the electrode tip cooperate to provide an interlock therebetween which will resist tension as well as compressive stresses and maintain, by means of the corrugations thereof, an extremely waterproof type of seal, while affording a low electrical contact resistance which aids in the passage of the welding current with a minimum of heating.

Still another object of the present invention is to provide an economical welding electrode whereby the end tip portion thereof may be replaced at a minimum of cost and at a saving of considerable material.

Other objects and advantages of the novel details of construction of the present invention will be made more apparent as the description proceeds in connection with the accompanying drawing, wherein:

Figure 1 is a pictorial representation of the welding electrode having a portion thereof cut away so as to illustrate the novel features of an embodiment of the cap of the welding electrode of the present invention;

Figure 2 is a cross-sectional exploded view of an embodiment of the cap type welding electrode useful in illustrating the many improved constructional features thereof;

Figure 3 is a sectional view of the fluted type of shank used in the cap type welding electrode;

Figure 4 is a sectional view of the cap electrode illustrating a taper at the bottom thereof, and Figure 5 is a cross-sectional view of a cap tip partially inserted in a shank with a lead chamfer cut on both the shank and cap tip.

Welding electrodes are usually fabricated with a tip portion for contacting the work piece, and a tubular shank portion which permits the passage of a coolant therethrough to the tip portion. In most uses, the tip portion and the shank are integrally formed so that when the tip is mushroomed by use or wastes away so that it is no longer adaptable for use, it is necessary to discard the entire structure.

In times of metal shortages or for purposes of economy, it may be advantageous to utilize a type of electrode wherein a replaceable cap is fabricated for the tip to be inserted within the shank portion of the welding electrode so that in the event that the work face or work tip becomes wasted or eroded, it may be possible to remove such a surface and to replace the same while substantially permanently retaining the shank portion of the welding electrode for renewed, repeated utilization thereof. In this manner, a substantial saving is made in the material necessarily utilizable for welding electrodes.

However, replaceable tips or caps heretofore utilized have encountered difficulties relative to formation of a satisfactory seal or joint between the cap or end tip and the shank of the electrode whereby insufficient strength and poor electrical conductivity have resulted.

Generally speaking, the present invention provides an improved cap type of electrode fabricated of copper or suitable copper alloy wherein, through the many novel constructional improvements made in the cap tip structure in relation to the shank tip cooperating therewith, a substantially improved seal is obtained between the cap tip structure and the shank. The shank, moreover, may be so constructed that on the outer lead end surface, an angle is provided such as to allow that the leading edge of the insertable cap skirt may positively and accurately be aligned to enter therein with great ease and facility. Upon seating of the cap tip in the cap shank, there is provided excellent electrical and thermal conductivity for the cap and the coolant introduced thereto is completely sealed by the deformation which occurs in the corrugations as they enter the shank bore. Moreover, by this novel construction it is possible to make tip shanks from old or used electrodes by merely cutting off the nose of the electrode and counterboring a hole of the proper diameter to receive the cap type electrode.

Referring now to the figures of the drawings in detail, there is shown a welding electrode having a tip holder generally indicated at 10, comprising a tubular body 11 adapted to be clamped to an arm of a resistance welding machine, and having a tapered end socket 12 to receive the shank 13 of a welding tip 14. A cooling fluid cavity 15 is formed in the shank 13 and this cavity communicates with the interior passage 16 of the tip holder or barrel. A conduit 17 extends through the passage 16 through cooling fluid cavity 15 and into fluid cavity 24, said conduit being mounted on the fluid connection member 18 which is supported by the holder 10. The connection 18 is provided with inlet and outlet pipes 19 and 20 which communicate, respectively, with the conduit 17 and passage 16. As seen in Fig. 3 of the drawing, the tip shank consists of a tubular metal section, the bore of which comprises a plurality of flutes or splines 50 so as to provide most effective coolant conduction.

Accordingly, it will be apparent that a continuous stream of cooling fluid may be passed through the inlet 19, conduit 17, cooling fluid cavity 24, passage 15, passage 16 and outlet 20, thereby to cool the cap tip 14 as the welding operation proceeds.

The head of the shank tip 13 has been bored so as to form a socket-like configuration 25 with a circumferential inner wall 31 and a top outside shoulder 32 which will cooperate with the copper or suitable copper alloy replaceable cap or nose portion 23 to seat the same, as hereinafter described. It is to be noted that the inner circumferential wall of shank tip 13 is tapered at a predetermined angle, for example, 2°, so as to cooperate with the replaceable cap or nose in a manner which will be more fully apparent as the description proceeds.

The replaceable cap or nose 23 of welding tip 14, as adapted to fit within socket 25 of tip 14 to replaceably interlock therewith, comprises a welding face 40, which may be of any desired shape and which is adapted to engage the work to be welded; a nose section 41 and a hollow skirt 42 for attachment to the socket of the welding tip. The skirt 42 is an integral part of the cap structure and is made having a series of annular corrugations 43, 43' etc. on both the outside and inside of the skirt wall 47. The corrugations 43, 43' are annular and face in a plane at right angles to the longitudinal center line of the electrode. It is to be noted further that the inside of the skirt portion of cap 23 is tapered in a manner such as to allow the skirt to conform with annular side wall 31 of socket 25 of the welding tip when seated. It has been found in tests conducted with the subject welding electrode that a various number of corrugations may be utilized in the cap construction, but that four annular corrugations seem to provide the most satisfactory results.

To form the corrugations on the skirt, a novel metal rolling method is utilized. A corrugated steel arbor is placed inside the machined skirt and a corrugated wheel is used against the outside of the skirt. The arbor is held in the chuck of a lathe while the rolling wheel is mounted in a tool post of the lathe. Then the corrugations on the arbor and rolling wheel are matched and a cap skirt placed on the arbor. The outside rolling wheel is then forced against the outside of the skirt, thus displacing the metal in the cap skirt and forming corrugations thereon.

In Fig. 4 of the drawing, it is to be noted that the bottom or lip of the corrugated skirt 42 of the cap may have a slight taper on the outside diameter at its extreme end 80. This taper is known in the art as a "Morse" taper and is intentionally made so that when the cap is inserted in the shank, this taper will mate with the corresponding "Morse" taper of the shank. Hence, when the cap is inserted in the shank prior to forceably seating it completely, the cap rests squarely and securely in position and the axial alignment of the cap and shank is automatically assured. The corresponding mating tapers of cap and shank permit the components to be placed in alignment prior to seating, thus avoiding the possibility of the cap being forced into the shank askew and this also avoids damage to the cap skirt or shank taper.

Fig. 5 discloses the utilization of the old shank of a welding electrode so as to adapt it for use with the corrugated skirt of the present invention. The drawing discloses that the shank may be counterbored so as to have a hole of sufficient diameter in which the corrugated skirt of the cap may be forcibly inserted. At the top of the hole in the shank a chamfer 82 is provided so that the leading edge of the skirt may enter easily. This construction provides excellent electrical and thermal conductivities for the electrode cap and the coolant is completely sealed by the deformation which occurs in the corrugations as they enter the shank hole. By this construction it is possible to make shanks from old or used electrodes by merely cutting off the nose of the electrode and counterboring a hole of the proper diameter to receive the cap type electrode.

As noted in all cases, when the cap skirt initially enters the shank, the first, or lowest, corrugation on the cap skirt makes contact with the shank taper slightly below the top thereof as, for example, in Fig. 2, beneath point 60. This insures satisfactory entering of the cap skirt into the taper of the shank. The cap is seated within the socket of the shank by means of the applied force of the welding machine which tends to force fit the cap downwardly until the cap rests on shoulder 32 of the socket.

It is now apparent that the annular corrugations 43, 43′ formed in the cap skirt 42 serve several novel purposes and afford great advantages over the usual type of replaceable cap. The several annular corrugations provide a series of sealing rings which when the cap is seated, effectively prevent the escape of any coolant introduced therein. Since the corrugations are smoothly rounded on the outside, they deform easily within the shank taper so as to reduce to a minimum the disadvantages inherent in other cap structures of scoring or galling the taper formed within the shank.

It is a mechanical characteristic of the corrugations that although they permit ready deformation within the shank taper, they individually possess considerable resilience so that when they are deformed, they afford a tight fit between it and the shank while avoiding seizure therebetween. By reason of the development of these anuular rings and the relative movement between them and the shank taper, there is effectively removed surface soil and surface films from the adjoining surfaces so as to assure a low electrical contact resistance and thus to aid in the passage of the welding current with a minimum of heating. In addition, the manner in which the annular corrugations deform into the shank taper structure, together with their resiliency, effectively compensates for any irregularity which may be found in the manufacture of the cap skirt and/or shank taper, since better conformation is obtained through the corrugated rings.

It is an important feature of the invention that the cap itself may be easily removed when necessary upon the erosion of the welding face or the mushrooming thereof. It was found in one of the embodiments of the invention that a static force of 750 lbs. was necessary to seat the cap while a static force of 300 lbs. was required for removal. Again, in another test, it was found that a force of 730 lbs. was required for seating and only 370 lbs. for removal was necessary. This was a static operation. However, on a welding machine, a 600 lb. force applied dynamically was found sufficient to seat the caps completely, with the caps being then removable with applied forces of reasonable magnitude. In these tests, the corrugations sealed off all the coolant completely and on performance provided service comparing favorably with that of any solid electrode welding tip. For removal of the caps, it was found that the caps might be removed very easily from the shank by driving or forcing a wedge shaped tool between the junction of the cap and the shank. Thus, with but slight separation of the cap from the shank, the cap was enabled to be completely loosened because of the amount of permanent deformation which occurred when the cap skirt was seated into the socket of the shank tip. It remained only to lift the cap slightly up on the shank taper so as to completely remove the cap therefrom. The cap was thus removed from the shank without noticeable damage to the shank taper.

It was further found that optimum performance of the cap type electrode was obtained when the adjoining surfaces of the cap skirt and shank taper were comparatively clean and when the abutting shoulders of the cap head bottom and the shank top surface were parallel in order to prevent tarnishing of these contacting surfaces of the cap and shank and to assure low contact resistance. It is contemplated within the scope of this invention that the contacting surfaces may be plated with such metals as silver or possibly rhodium or indium.

The cap type electrode here described is adaptable with welding electrode designs known in the industry or art as a size #2 "Morse" taper electrode (⅝″ major body diameter); a #1 "Morse" taper electrode (½″ diameter); and a #3 "Morse" taper electrode (⅞″ diameter); with the number of annular rings being dependent upon the type of taper being used and the dimension of the skirt sections necessary to conform to such taper. Therefore, while the present invention has been described herein with reference to the specific embodiment here shown, the applicant desires not to be limited thereby, but intends to cover the invention within the spirit and scope of the appended claims.

What is claimed is:

1. In a welding electrode including a hollow welding tip including a shank portion, said shank having a determined taper and an angulated outer lead end surface, a cap structure comprising a welding face and a leading edge adapted to be placed adjacent to and cooperating with said outer lead end surface of said shank so as to positively direct and axially align said cap for entry within said shank, said cap having a skirt portion having a taper adapted to mate with said taper of said shank depending therefrom and including a series of annular rings having resilient interconnections among themselves formed on both the inner and outer surfaces of the wall of said skirt, said rings thus being both adjustably fitted by entry into said shank and resilient so as to afford a releasable tight grip between said cap and said shank while at the same time avoiding seizure between the surfaces thereof.

2. In a welding electrode comprising a hollow welding tip including a shank portion, said shank having a determined taper and including a portion having an angulated outer lead end surface, a cap structure having a welding nose and a skirt interconnected by a shoulder formed on said cap, said skirt having a leading edge adapted to cooperate with said end surface of said shank so as to predeterminedly align and direct the entry of said cap within said shank in accordance with the taper formed therein, said skirt of said cap having a taper adapted to mate with said taper of said shank and including a series of annular corrugations on both its inner and outer surfaces, said corrugations being both deformable so as to provide a tight fit between said shank and said cap and being resilient so as to aid in the welding pressure on said shoulders of said cap and shank while avoiding galling and seizure between the surfaces of both the cap and shank.

3. In a welding electrode comprising a hollow welding tip including a shank portion, said shank having a determined taper and an angulated outer lead end surface connected to a shoulder, a cap structure having a welding face and a leading edge interconnected by a shoulder, said leading edge being placed opposite said welding face for cooperating with said end surface of said shank so as to positively direct the entry of said cap on said inner surface of said shank, said cap being of a determined taper adapted to mate with said taper of said shank and having an integrally formed skirt connected to said shoulder of said welding face and including a series of interconnected annular resilient rings, said rings being curved on both the inner and outer surfaces of said skirt, said last of said series of corrugations adapted to include said leading edge of said cap, said rings thereof being both deformable and resilient so as to afford a tight friction fit between said cap and shank providing efficient electrical conductivity between said cap and said shank while at the same time avoiding galling therebetween.

WILLIAM G. FETTER.
ARTHUR F. WOOD.
EDMAN F. HOLT.

References Cited in the file of this patent

UNITED STATES PATENTS

| Number | Name | Date |
|---|---|---|
| 743,193 | Rainforth | Nov. 3, 1903 |
| 783,545 | Rowland | Feb. 28, 1905 |
| 1,781,935 | Grand | Nov. 18, 1930 |
| 1,928,841 | Morse | Oct. 3, 1933 |
| 2,138,388 | Platz | Nov. 29, 1938 |